United States Patent
Yang et al.

(10) Patent No.: US 9,625,770 B2
(45) Date of Patent: *Apr. 18, 2017

(54) DISPLAY PANEL

(71) Applicant: INNOLUX CORPORATION, Jhu-Nan, Miao-Li County (TW)

(72) Inventors: Ching-Che Yang, Jhu-Nan (TW); Tsung-Han Tsai, Jhu-Nan (TW); Chao-Hsiang Wang, Jhu-Nan (TW); An-Chang Wang, Jhu-Nan (TW)

(73) Assignee: INNOLUX CORPORATION, Jhu-Nan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/194,506

(22) Filed: Jun. 27, 2016

(65) Prior Publication Data

US 2016/0306239 A1    Oct. 20, 2016

Related U.S. Application Data

(63) Continuation of application No. 14/604,597, filed on Jan. 23, 2015, now Pat. No. 9,400,407.

(30) Foreign Application Priority Data

May 7, 2014   (TW) ............................. 103116302 A

(51) Int. Cl.
*G02F 1/1343*   (2006.01)

(52) U.S. Cl.
CPC .... *G02F 1/134309* (2013.01); *G02F 1/13439* (2013.01); *G02F 1/134363* (2013.01); *G02F 2001/134345* (2013.01); *G02F 2001/134372* (2013.01); *G02F 2201/123* (2013.01)

(58) Field of Classification Search
CPC ....................... G02F 1/134309; G02F 1/13439
USPC .......................................................... 349/141
See application file for complete search history.

(56) References Cited

U.S. PATENT DOCUMENTS

2007/0247579 A1* 10/2007 Cho ................. G02F 1/133707
                                                                349/139
2013/0300991 A1   11/2013 Lim

FOREIGN PATENT DOCUMENTS

KR         20130125638         11/2013

* cited by examiner

*Primary Examiner* — Lucy Chien
(74) *Attorney, Agent, or Firm* — Liu & Liu

(57) ABSTRACT

A display panel includes a first substrate, a second substrate and an electrode layer. The first substrate and the second substrate are disposed opposite to each other. The electrode layer is disposed on the first substrate and facing the second substrate, and includes at least a first part and a second part adjacent to the first part. The first part includes a plurality of first branch electrodes disposed along a direction and spaced from each other by a first distance (T). The centers of two adjacent ones of the first branch electrodes are separated by a second distance (P). The first part and the second part have a spacing (S) therebetween. The values of S, T and P satisfy the following equation:

$$\frac{1}{2a}\cdot\left(b+\frac{P\cdot m}{\sqrt{2}}+\frac{1}{4}\cdot\frac{T^2}{P}\right)-1.5 \leq S \leq \frac{1}{2a}\cdot\left(b+\frac{P\cdot m}{\sqrt{2}}+\frac{1}{4}\cdot\frac{T^2}{P}\right)+1.5$$

wherein, $a=\frac{1}{12}$, $b=\frac{1}{4}$, $m=\frac{1}{10}$, and the units of S, T and P are micrometer.

8 Claims, 12 Drawing Sheets

DISPLAY PANEL

CROSS REFERENCE TO RELATED APPLICATIONS

This application is a continuation application of U.S. Ser. No. 14/604,597, filed Jan. 23, 2015, which claims priority under 35 U.S.C. §119(a) on Patent Application No(s). 103116302 filed in Taiwan, Republic of China on May 7, 2014, the entire contents of which are hereby incorporated by reference.

BACKGROUND OF THE INVENTION

Field of Invention

The invention relates to a display panel and, in particular, to a display panel with higher transmittance.

Related Art

With the progress of technologies, flat display devices have been widely applied to various kinds of fields. Especially, liquid crystal display (LCD) devices, having advantages such as compact structure, low power consumption, less weight and less radiation, gradually take the place of cathode ray tube (CRT) display devices, and are widely applied to various electronic products, such as mobile phones, portable multimedia devices, notebooks, LCD TVs and LCD screens.

In the multi-domain vertical alignment (MVA) process for enhancing the quality of the TFT LCD, the polymer sustained alignment (PSA) technology is a sufficiently mature technique to achieve the mass production and enhance the optical features such as aperture ratio and contrast. In the PSA technology, photosensitive monomers are mixed with the liquid crystal during the one drop filling (ODF) process, and then an ultraviolet exposure is executed while an electric field is applied, so that the photosensitive monomers within the liquid crystal are chemically reacted. Consequently, the reacted monomers are arranged according to the pattern of the transparent conductive layer of a plurality of pixels of the TFT substrate so that the LC alignment can be achieved by the photocured monomers.

For the same illuminance, a display panel with a higher transmittance can save more power for the display device. Therefore, the industry strives to increase the transmittance of the display panel to save more energy and enhance the product competitiveness. The pattern design of the transparent conductive layer of the pixel is a key factor in the transmittance of the display panel. Especially with the higher and higher resolution of the panel, the pattern of the transparent conductive layer of the pixel is a factor that needs to be explored to configure the panel with a higher transmittance.

SUMMARY OF THE INVENTION

An objective of the invention is to provide a display panel with a higher transmittance so as to enhance the product competitiveness.

To achieve the above objective, a display panel according to the invention comprises a first substrate, a second substrate disposed opposite to the first substrate and an electrode layer. The electrode layer is disposed on the first substrate and faces the second substrate, and includes at least a first part and a second part adjacent to the first part. The first part includes a plurality of first branch electrodes and a first connecting electrode, and the first branch electrodes are disposed along a direction and spaced from each other by a first distance (T). When a light passes through the first branch electrodes, a brightness distribution composed of a plurality of bright textures and a plurality of dark textures is generated. The centers of two adjacent ones of the bright textures are separated by a second distance (P). The first connecting electrode is adjacent to the second part and connected with the first branch electrodes, and the second part includes a second connecting electrode adjacent to the first part. The first connecting electrode and the second connecting electrode are corresponding to each other and separated by a spacing (S). Herein, the values of S, T and P satisfy the following equation:

$$\frac{1}{2a}\cdot\left(b+\frac{P\cdot m}{\sqrt{2}}+\frac{1}{4}\cdot\frac{T^2}{P}\right)-1.5 \leq S \leq \frac{1}{2a}\cdot\left(b+\frac{P\cdot m}{\sqrt{2}}+\frac{1}{4}\cdot\frac{T^2}{P}\right)+1.5$$

Wherein, $a=1/12$, $b=1/4$, $m=1/10$, and the units of S, T and P are micrometer.

To achieve the above objective, a display panel according to the invention comprises a first substrate, a second substrate disposed opposite to the first substrate and an electrode layer. The electrode layer is disposed on the first substrate and faces the second substrate, and includes at least a first part and a second part adjacent to the first part. The first part includes a plurality of first branch electrodes and a first connecting electrode, the first branch electrodes are disposed along a direction and spaced from each other by a first distance (T), the centers of two adjacent ones of the first branch electrodes are separated by a second distance (P), the first connecting electrode is adjacent to the second part and connected with the first branch electrodes, the second part includes a second connecting electrode adjacent to the first part, the first connecting electrode and the second connecting electrode are corresponding to each other and separated by a spacing (S), and the values of S, T and P satisfy the following equation:

$$\frac{1}{2a}\cdot\left(b+\frac{P\cdot m}{\sqrt{2}}+\frac{1}{4}\cdot\frac{T^2}{P}\right)-1.5 \leq S \leq \frac{1}{2a}\cdot\left(b+\frac{P\cdot m}{\sqrt{2}}+\frac{1}{4}\cdot\frac{T^2}{P}\right)+1.5$$

Wherein, $a=1/12$, $b=1/4$, $m=1/10$, and the units of S, T and P are micrometer.

To achieve the above objective, a display panel according to the invention comprises a first substrate, a second substrate disposed opposite to the first substrate and an electrode layer. The electrode layer is disposed on the first substrate and faces the second substrate, and includes at least a first part and a second part adjacent to the first part. The first part includes a plurality of first branch electrodes, the first branch electrodes are disposed along a direction and spaced from each other by a first distance (T), when a light passes through the first branch electrodes, a brightness distribution composed of a plurality of bright textures and a plurality of dark textures is generated, the centers of two adjacent ones of the bright textures are separated by a second distance (P), the first part and the second part have a spacing (S), and the values of S, T and P satisfy the following equation:

$$\frac{1}{2a}\cdot\left(b+\frac{P\cdot m}{\sqrt{2}}+\frac{1}{4}\cdot\frac{T^2}{P}\right)-1.5 \leq S \leq \frac{1}{2a}\cdot\left(b+\frac{P\cdot m}{\sqrt{2}}+\frac{1}{4}\cdot\frac{T^2}{P}\right)+1.5$$

Wherein, a=1/12, b=1/4, m=1/15, and the units of S, T and P are micrometer.

To achieve the above objective, a display panel according to the invention comprises a first substrate, a second substrate disposed opposite to the first substrate and an electrode layer. The electrode layer is disposed on the first substrate and faces the second substrate, and includes at least a first part and a second part adjacent to the first part. The first part includes a plurality of first branch electrodes, the first branch electrodes are disposed along a direction and spaced from each other by a first distance (T), the centers of two adjacent ones of the first branch electrodes are separated by a second distance (P), the first part and the second part have a spacing (S), and the value of S, T and P satisfy the following equation:

$$\frac{1}{2a} \cdot \left( b + \frac{P \cdot m}{\sqrt{2}} + \frac{1}{4} \cdot \frac{T^2}{P} \right) - 1.5 \leq S \leq \frac{1}{2a} \cdot \left( b + \frac{P \cdot m}{\sqrt{2}} + \frac{1}{4} \cdot \frac{T^2}{P} \right) + 1.5$$

Wherein, a=1/12, b=1/4, m=1/15, and the units of S, T and P are micrometer.

As mentioned above, in the display panel of the invention, the first branch electrodes of the electrode layer are disposed along a direction and spaced from each other by a first distance (T), the centers of two adjacent ones of the bright textures are separated by a second distance (P), and the first connecting electrode and the second connecting electrode are corresponding to each other and separated by a spacing (S). Or, the first branch electrodes are disposed along a direction and spaced from each other by a first distance (T), the centers of two adjacent ones of the first branch electrodes are separated by a second distance (P), and the first connecting electrode and the second connecting electrode are corresponding to each other and separated by a spacing (S). When the values of S, T, P satisfy the following equation, a better total equivalent permeable area can be provided and the display panel can be thus configured with a better transmittance:

$$\frac{1}{2a} \cdot \left( b + \frac{P \cdot m}{\sqrt{2}} + \frac{1}{4} \cdot \frac{T^2}{P} \right) - 1.5 \leq S \leq \frac{1}{2a} \cdot \left( b + \frac{P \cdot m}{\sqrt{2}} + \frac{1}{4} \cdot \frac{T^2}{P} \right) + 1.5$$

Wherein, a=1/12, b=1/4, m=1/10, or a=1/12, b=1/4, M=1/15.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
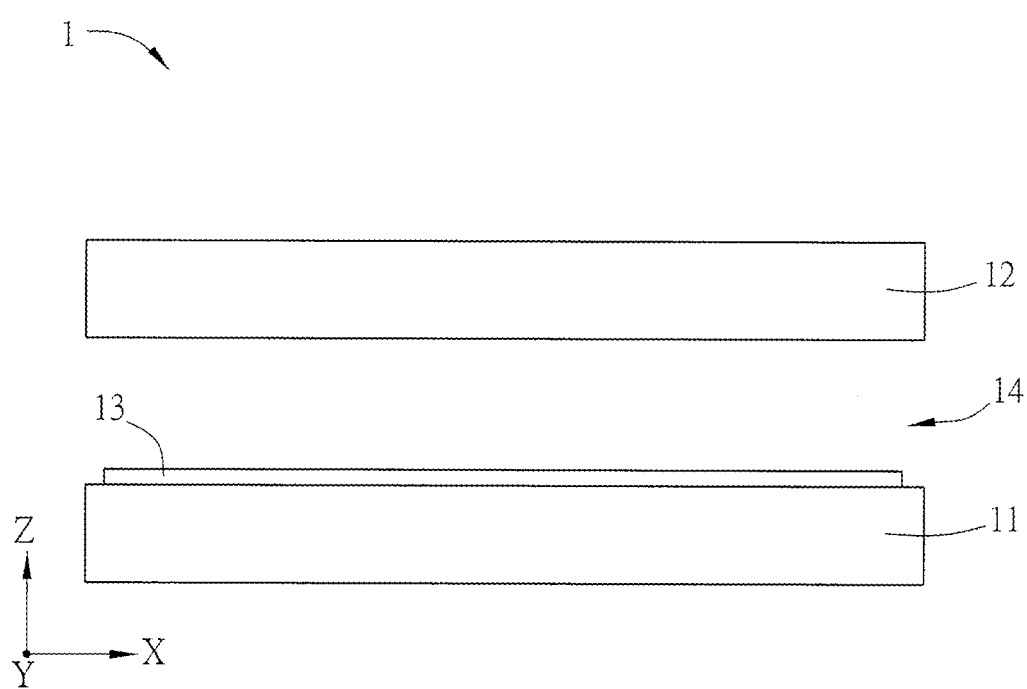
FIG. 1A is a schematic diagram of a display panel according to an embodiment of the invention.
Figure 1B:
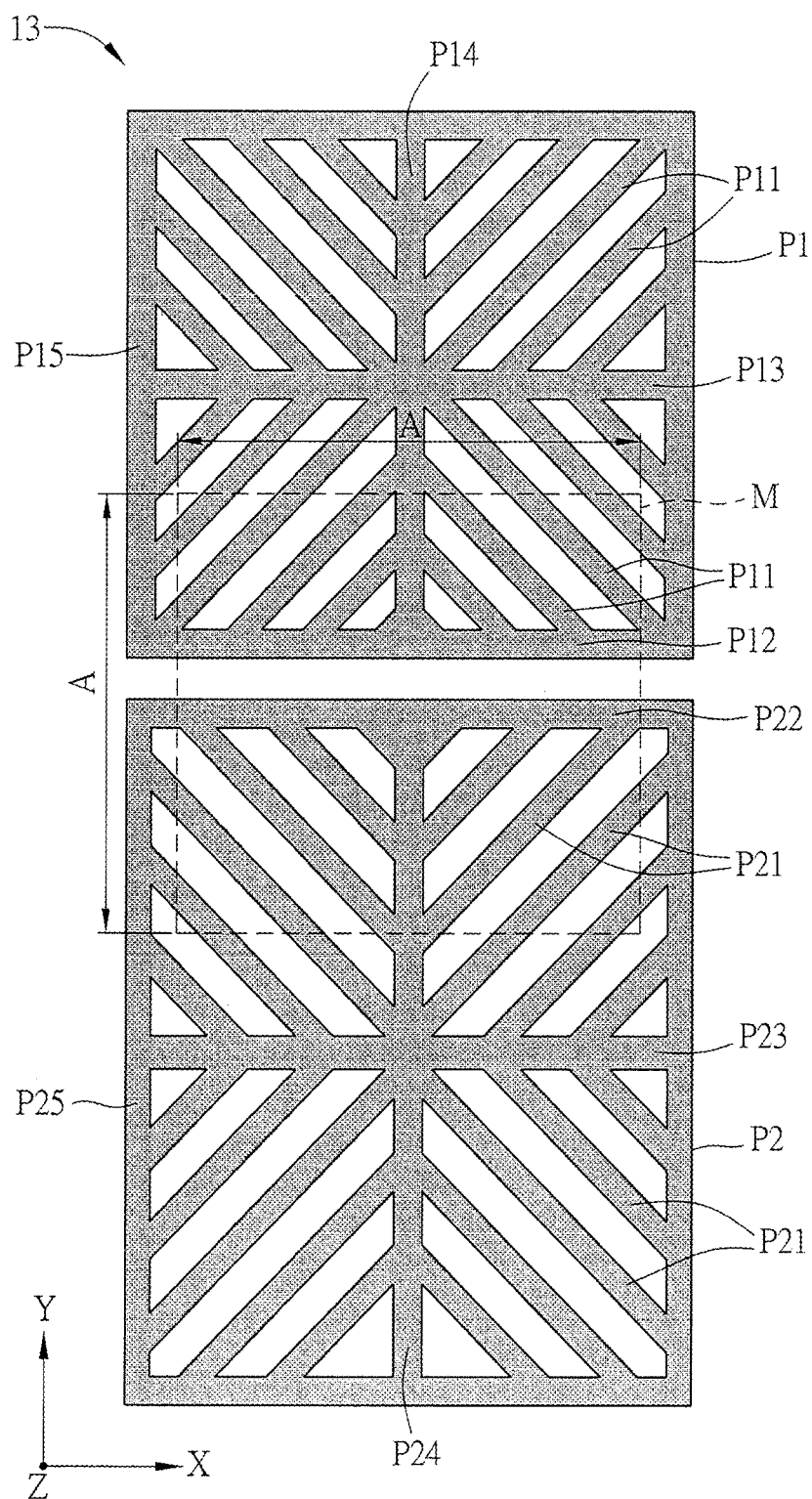
FIG. 1B is a schematic diagram of the electrode pattern of the electrode layer of the display panel.

FIG. 1A is a schematic diagram of a display panel 1 according to an embodiment of the invention, and FIG. 1B is a schematic diagram of the electrode pattern of the electrode layer 13 of the display panel 1.

The display panel 1 is, for example but not limited to, an in-plane switch (IPS) liquid crystal display (LCD) panel, a fringe field switching (FFS) LCD panel, a vertical alignment mode (VA mode) LCD panel or a 3D LCD panel. For the following description to be easily known, the first direction X, the second direction Y and the third direction Z are shown in the figures, and any two of them are perpendicular to each other. For example, the first direction X is substantially parallel to the extending direction of the scan line of the display panel 1, the second direction Y is substantially parallel to the extending direction of the data line of the display panel 1, and the third direction Z is perpendicular to the first direction X and the second direction Y.

The display panel 1 includes a first substrate 11, a second substrate 12 and an electrode layer 13. The display panel 1 can further include a liquid crystal (LC) layer 14 (LC molecules are not shown). The first substrate 11 and the second substrate 12 are disposed opposite to each other, and the LC layer 14 is disposed between the first and second substrates 11 and 12.

Each of the first substrate 11 and the second substrate 12 is made by a transparent material, and can be a glass substrate, a quartz substrate or a plastic substrate for example. However, this invention is not limited thereto.

The electrode layer 13 is disposed on the first substrate 11 and faces the second substrate 12. Herein, FIG. 1B just shows a part of the electrode layer 13 in FIG. 1A. The electrode layer 13 is a transparent conductive layer, and the material thereof is, for example but not limited to, indium-tin oxide (ITO) or indium-zinc oxide (IZO). In this embodiment, the electrode layer 13 is a pixel electrode layer and electrically connected to the data line. Moreover, the display panel 1 can further include a plurality of scan lines (not shown) and a plurality of data lines (not shown), and the scan lines intersect with the data lines to define the area of a plurality of pixels. To be noted, the pattern of the electrode layer 13 shown in FIG. 1B can be included in a single pixel of the display panel 1 or in the two adjacent pixels of the display panel 1, but this invention is not limited thereto.

The electrode layer 13 includes at least a first part P1 and a second part P2 adjacent to the first part P1. Herein, a first part P1 and a second part P2 are shown in FIG. 1B. The first part P1 includes a plurality of first branch electrodes P11, a first connecting electrode P12, a first main electrode P13 and a second main electrode P14. The first main electrode P13 intersects with the second main electrode P14 and are located at the central portion of the first part P1. Besides, the first branch electrodes P11 are connected with the first main electrode P13 or the second main electrode P14, and the first connecting electrode P12 is connected with the second main electrode P14. Herein, the first branch electrodes P11 are connected with the first main electrode P13 and the second main electrode P14. The included angle between the first main electrode P13 and the second main electrode P14 can be between 80° and 100°, and the included angle between the first main electrode P13 or second main electrode P14 and the first branch electrodes P11 can be between 5° and 85°. In this embodiment, the included angle between the first main electrode P13 and the second main electrode P14 is 90°, and the included angle between the first branch electrodes P11 and each of the first main electrode P13 and the second main electrode P14 is 45°, for example. Moreover, the first part P1 further includes a first surrounding electrode P15 (located on the left, upper and right sides of the first part P1) which surrounds the first branch electrodes P11, the first main electrode P13 and the second main electrode P14, and the first surrounding electrode P15 is connected with the first branch electrodes P11, the first connecting electrode P12, the first main electrode P13 and the second main electrode P14.

The second part P2 includes a plurality of second branch electrodes P21, a second connecting electrode P22, a third main electrode P23 and a fourth main electrode P24. The third main electrode P23 intersects with the fourth main electrode P24 and are located at the central portion of the second part P2. The second connecting electrode P22 is connected with the fourth main electrode P24. The included angle between the third main electrode P23 and the fourth main electrode P24 can be between 80° and 100°, and the included angle between the third main electrode P23 or fourth main electrode P24 and the second branch electrodes P21 can be between 5° and 85°. In this embodiment, the included angle between the third main electrode P23 and the fourth main electrode P24 is 90°, and the included angle between the second branch electrodes P21 and each of the third main electrode P23 and the fourth main electrode P24 is 45°, for example. Moreover, the second part P2 further includes a second surrounding electrode P25 (located on the left, lower and right sides of the second part P2) which surrounds the second branch electrodes P21, the third main electrode P23 and the fourth main electrode P24, and the second surrounding electrode P25 is connected with the second branch electrodes P21, the second connecting electrode P22, the third main electrode P23 and the fourth main electrode P24.

The first main electrode P13 intersects with the second main electrode P14 and are located at the central portion of the first part P1, and the third main electrode P23 intersects with the fourth main electrode P24 and are located at the central portion of the second part P2, as shown in FIG. 1B, so the first part P1 can be divided into four electrode regions by the first main electrode P13 and the second main electrode P14, and the second part P2 also can be divided into four electrode regions by the third main electrode P23 and the fourth main electrode P24. However, for making the subsequent transmittance computation easier, just a region M with the width A is taken from the first and second parts P1 and P2 for the illustration. The width A is less than that of the electrode layer 13 along the first direction X for example.

Figure 2A:
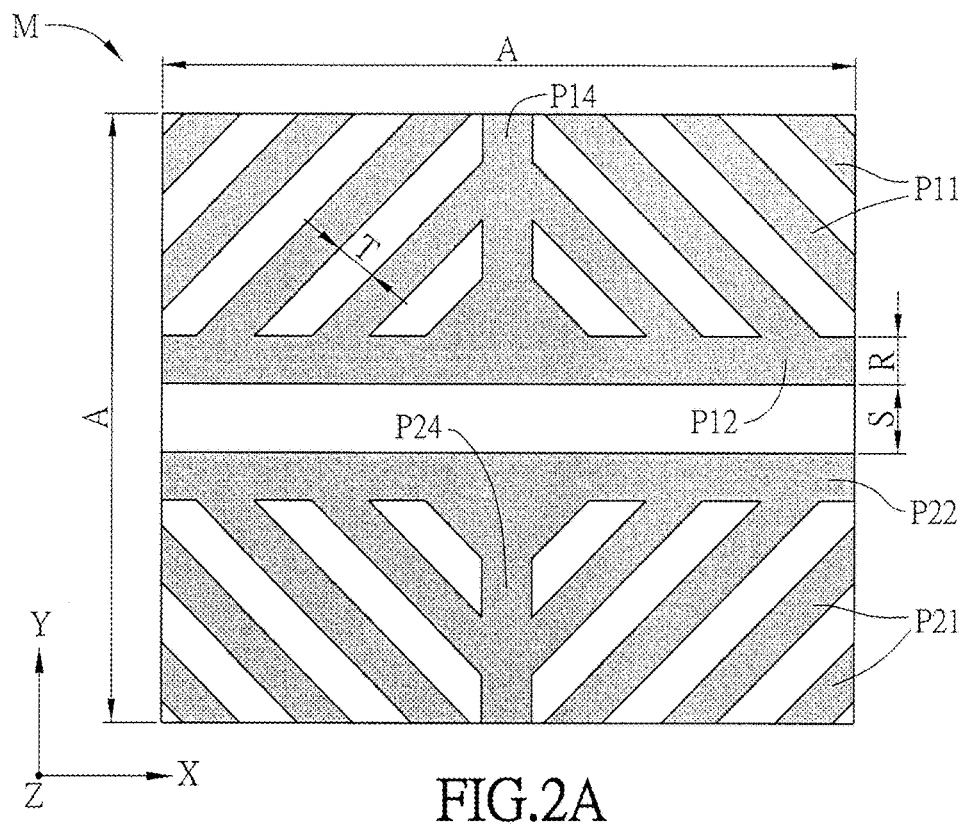
FIG. 2A is a schematic diagram of the region M in FIG. 1B.
Figure 2B:
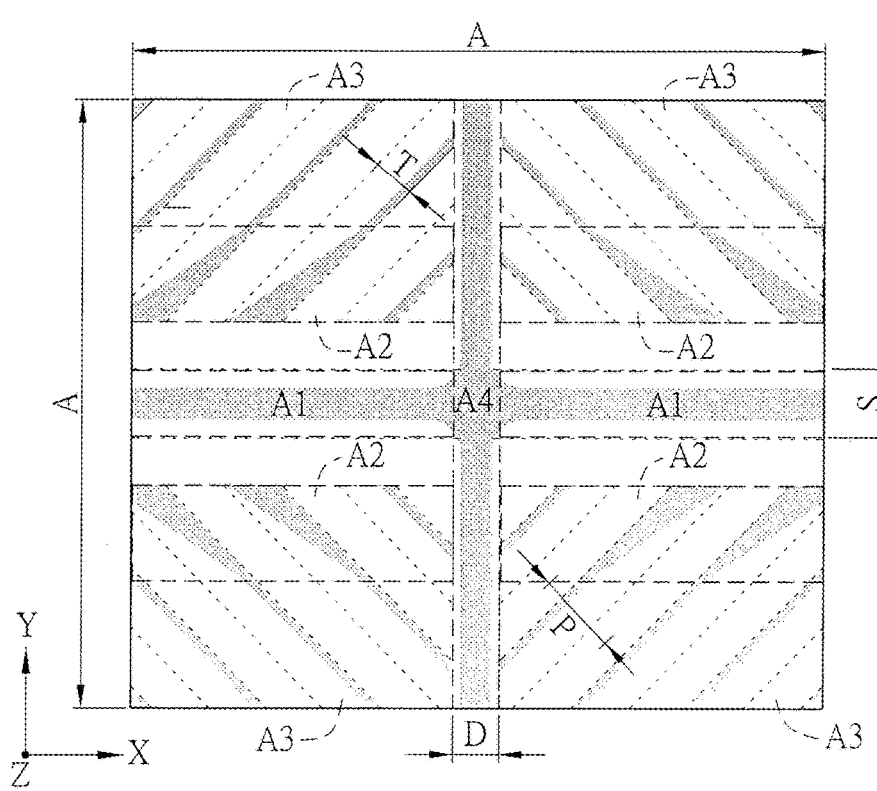
FIG. 2B is a schematic diagram of the brightness distribution generated when the light passes through the region M.

FIG. 2A is a schematic diagram of the region M in FIG. 1B, and FIG. 2B is a schematic diagram of the brightness distribution generated when the light passes through the region M. To be noted, FIG. 2B is just for the illustrative purpose but not for representing the actual brightness distribution.

As shown in FIG. 2A, the first branch electrodes P11 are disposed along a direction and spaced from each other by a first distance T. Herein, the first branch electrodes P11 on the upper left side of FIG. 2A are substantially parallelly disposed along a direction and spaced by the first distance T, and the first branch electrodes P11 on the upper right side of FIG. 2A are substantially parallelly disposed along another direction and spaced by the first distance T. Moreover, the second branch electrodes P21 on the lower left side of FIG. 2A are substantially parallelly disposed along the same direction as the first branch electrodes P11 on the upper right side and spaced by the first distance T, and the second branch electrodes P21 on the lower right side of FIG. 2A are substantially parallelly disposed along the same direction as the first branch electrodes P11 on the upper left side and spaced by the first distance T. The width range of the first branch electrodes P11 or second branch electrodes P21 can be between 1 μm and 5 μm for example and can be 1.5 μm and 4.5 μm favorably.

The first connecting electrode P12 of the first part P1 is adjacent to the second part P2 and connected to the first branch electrodes P11. The electrode width of the first connecting electrode P12 along the second direction Y is denoted by R. Moreover, the second connecting electrode P22 of the second part P2 is adjacent to the first part P1, and the first and second connecting electrodes P12, P22 are disposed correspondingly and separated by a spacing S. Furthermore, as shown in FIG. 2B, due to the electrode pattern of the region M, a brightness distribution composed of a plurality of bright textures and a plurality of dark textures will be generated when the light passes through the region M. When the corresponding bright textures and dark textures are generated by the light passing through the first or second branch electrodes P11 or P21, the centers of the two adjacent bright textures (or dark textures), as shown in FIG. 2H, have an interval of a second distance P.

When the spacing S between the first connecting electrode P12 and the second connecting electrode P22 is reduced, the area of the dark texture in the spacing S can be decreased, but however, the area of the triangular dark texture in the region A2 will also be increased. Therefore, when the spacing S has a better design value, the transmittance of the region M (and the display panel 1) also can reach a better value so that the energy can be saved and the product competitiveness can be enhanced.

As below, the dark textures in the region A1, A2, A3, A4 in FIG. 2B will be illustrated for obtaining a better design range of the spacing S so as to obtain a better transmittance. FIGS. 2C to 2F are schematic diagrams of the dark textures in different regions of the brightness distribution of FIG. 2B.

Figure 2C:
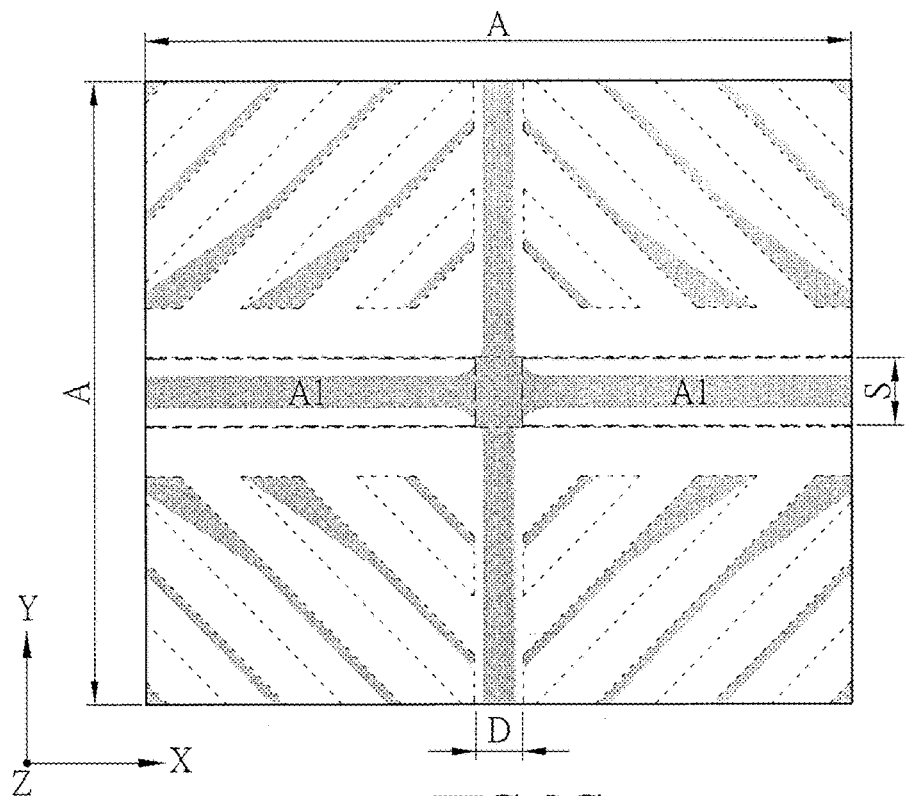
FIGS. 2C to 2F are schematic diagrams of the dark textures in different regions of the brightness distribution of FIG. 2B.

As shown in FIG. 2C, the region A1 is not totally dark, and the proportion of the dark texture is getting higher with the larger spacing S. From the simulation, it can be obtained that the proportion of the dark texture in the region A1 is $a*S-b$, wherein $a=1/12$, $b=1/4$. Thus, the area of the dark texture in the region A1 is equal to the area of the region A1 multiplied by the proportion of the dark texture in the region A1, as follows: $(A-D)\times S\times(a\times S-b)$.

Figure 2D:
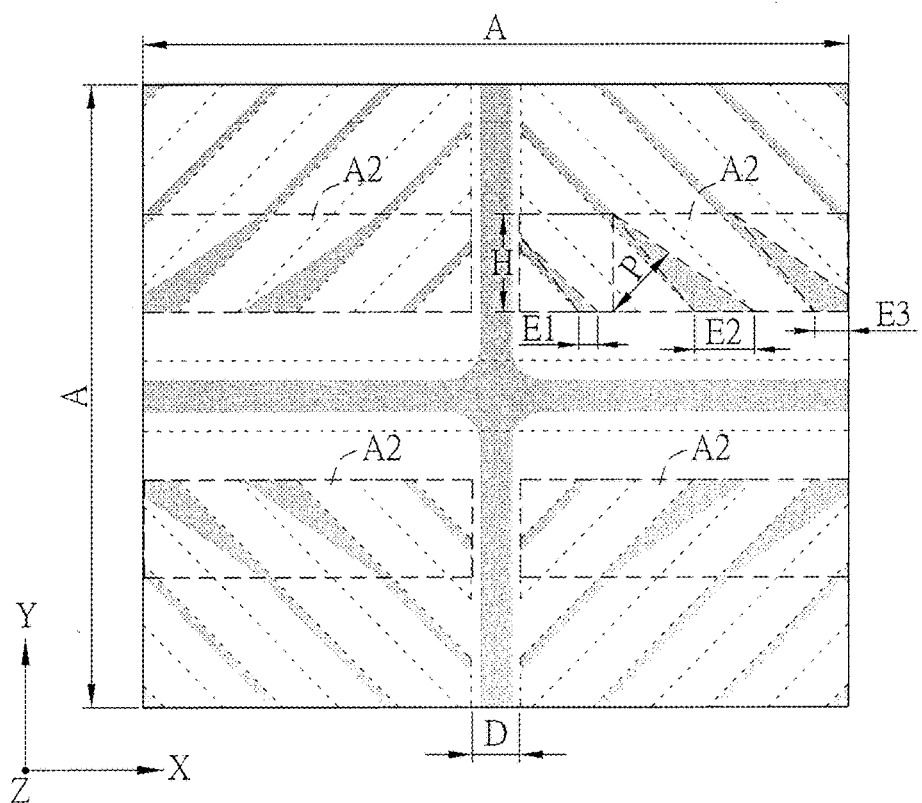

As shown in FIG. 2D, the region A2 has triangular dark textures. The region A2 is also not totally dark, and the proportion of the triangular dark textures is getting smaller with the larger spacing S. From the simulation, it can be obtained that the proportion of the dark texture of the region A2 is $-m*S+n$, wherein $m=1/10$, $n=13/10$. As shown in FIG. 2D, the base of the triangular dark texture is about equal to the interval between the adjacent dark textures. If the sum of the bases of the all triangular dark textures in a single region A2 on the upper right side of FIG. 2D is denoted by E ($E=E1+E2+E3$), E is about equal to $(A-D)/2*1/2$. The height of the hypotenuse of the triangular dark texture is about P, and the height H thereof is equal to $-\sqrt{2}P$. Accordingly, the area of the dark texture in the region A2 is equal to the area of the region A2 multiplied by the proportion of the dark texture in the region A2, as follows:

$$4 \times \frac{1}{2} \times \left(\frac{A-D}{4}\right) \times (\sqrt{2}\,P) \times (-m \times S + n)$$

Figure 2E:
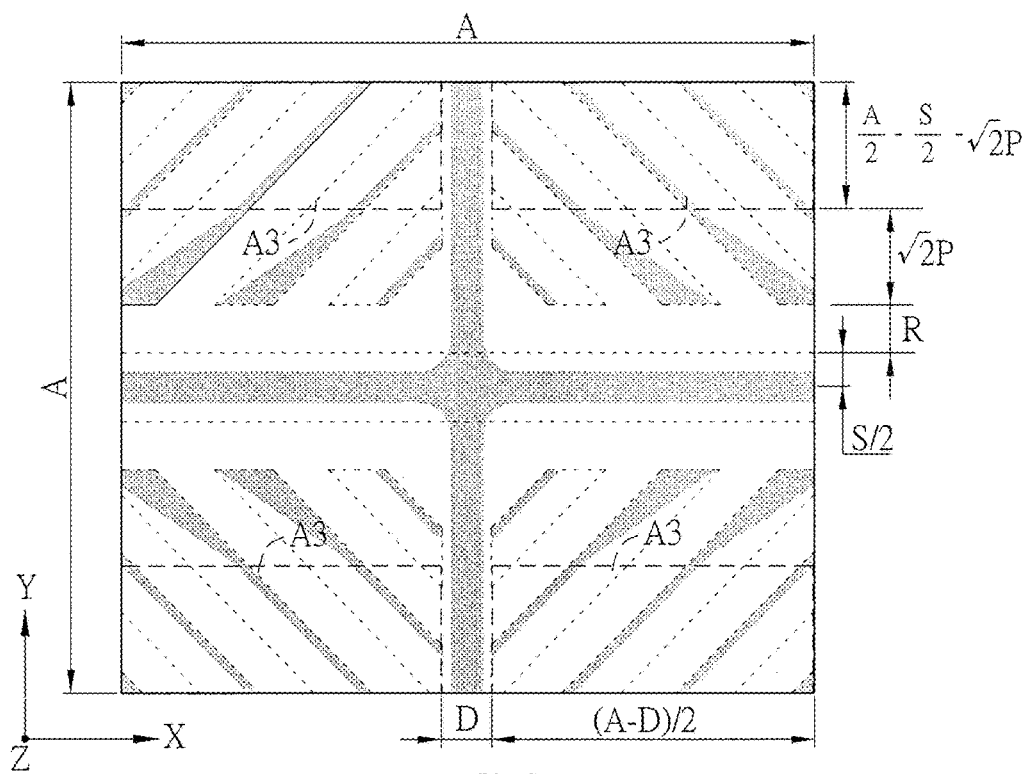

As shown in FIG. 2E, the region A3 is not totally dark, and the light and dark textures thereof are related to the second distance P, T. From the simulation, it can be obtained the proportion of the dark texture of the region A3 is:

$$(1/4) \times \left(\frac{T^2}{P}\right)$$

Hence, the area of the dark texture in the region A3 is equal to the area of the region A3 multiplied by the proportion of the dark texture in the region A3, as follows:

$$4 \times \left(\frac{A-D}{2}\right) \times \left(\frac{A}{S} - \frac{S}{2} - R - \sqrt{2}\,P\right) \times \frac{1}{4} \times \frac{T^2}{P}$$

Figure 2F:
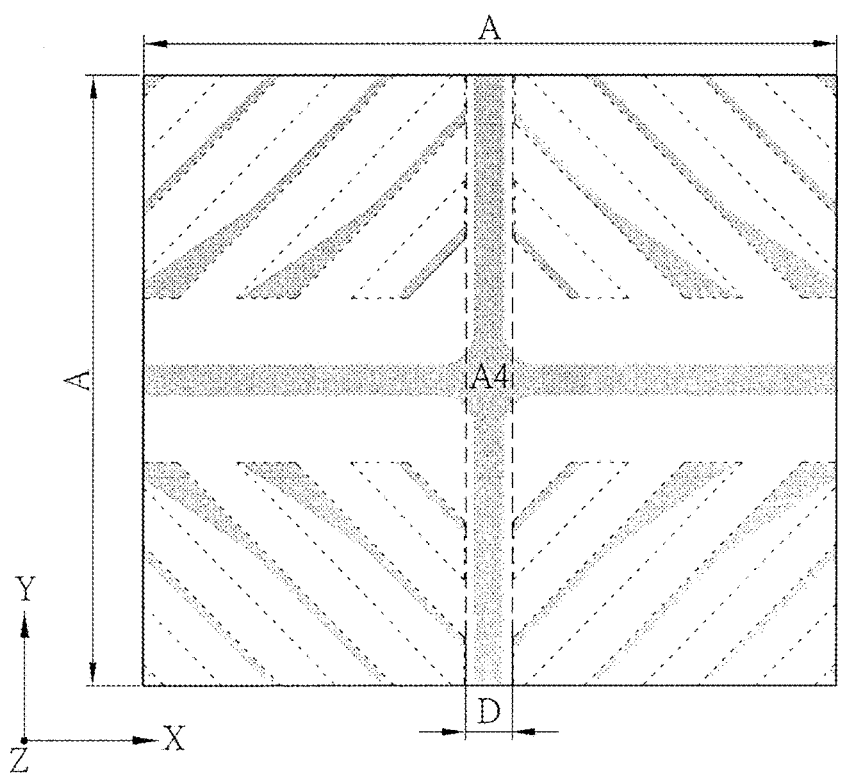

As shown in FIG. 2F, the area of the dark texture of the region A4 is equal to the width A multiplied by the width D (along the first direction X) of the dark texture formed by the second main electrode P14 and the fourth main electrode P24.

Since the transmittance is directly proportional to the total equivalent permeable area, the total equivalent permeable area (called effective permeable area hereinafter) is equal to the total area minus the dark-texture area of the region A1, the dark-texture area of the region A2, the dark-texture area of the region A3 and the dark-texture area of the region A4, as follows:

$$A^2 - (A-D) \times S \times (a \times S - b) - 4 \times \frac{1}{2} \times \left(\frac{A-D}{4}\right) \times (\sqrt{2}\,P) \times (-m \times S + n) -$$

$$4 \times \left(\frac{A-D}{2}\right) \times \left(\frac{A}{2} - \frac{S}{2} - R - \sqrt{2}\,P\right) \times \frac{1}{4} \times \frac{T^2}{P} - A \times D$$

Thus, the effective permeable area can be obtained as follows:

$$(A-D) \times \left\{ A - [(A - 2R - 2\sqrt{2}\,P) - S] \times \frac{1}{4} \times \frac{T^2}{P} - \right.$$

$$\left. (a \cdot S^2 - b \cdot S) - \left(\frac{-\sqrt{2}\,P \cdot m}{2} S + \frac{\sqrt{2}}{2} P \cdot n\right) \right\}$$

By differentiating the above equation and making it equal to zero to derive the maximum thereof, the equation can be obtained as follows:

$$\frac{1}{4} \times \frac{T^2}{P} - 2a \cdot S + b + \frac{P \cdot m}{\sqrt{2}} = 0$$

Accordingly, the equation can be obtained as follows:

$$S = \frac{1}{2a} \times \left(b + \frac{P \cdot m}{\sqrt{2}} + \frac{1}{4} \times \frac{T^2}{P}\right)$$

Wherein, $a=1/12$, $b=1/4$, $m=1/10$.

Moreover, in consideration of the process variation, the optimum range of the spacing S of this embodiment can be (equation 1):

$$\frac{1}{2a} \cdot \left(b + \frac{P \cdot m}{\sqrt{2}} + \frac{1}{4} \cdot \frac{T^2}{P}\right) - 1.5 \le S \le \frac{1}{2a} \cdot \left(b + \frac{P \cdot m}{\sqrt{2}} + \frac{1}{4} \cdot \frac{T^2}{P}\right) + 1.5$$

Wherein $a=1/12$, $b=1/4$, $m=1/10$, and the units of S, T, P are μm. Hence, when the values of S, T, P satisfy the above equation, a better effective permeable area can be provided and the display panel 1 can be thus configured with a better transmittance. However, more favorably, the display panel 1 can be configured with a much better transmittance if the values of S, T, P satisfy the following equation (equation 2):

$$\frac{1}{2a} \cdot \left(b + \frac{P \cdot m}{\sqrt{2}} + \frac{1}{4} \cdot \frac{T^2}{P}\right) - 1 \le S \le \frac{1}{2a} \cdot \left(b + \frac{P \cdot m}{\sqrt{2}} + \frac{1}{4} \cdot \frac{T^2}{P}\right) + 1$$

By substituting $a=1/12$ and $b=1/4$ into the equation 1 and 2, the equations can be obtained, respectively, as follows:

$$6 \times \left(\frac{P \cdot m}{\sqrt{2}} + \frac{1}{4} \cdot \frac{T^2}{P}\right) \le S \le \left[3 + 6 \times \left(\frac{P \cdot m}{\sqrt{2}} + \frac{1}{4} \cdot \frac{T^2}{P}\right)\right]$$

$$\frac{1}{2} + 6 \times \left(\frac{P \cdot m}{\sqrt{2}} + \frac{1}{4} \cdot \frac{T^2}{P}\right) \le S \le \frac{5}{2} + 6 \times \left(\frac{P \cdot m}{\sqrt{2}} + \frac{1}{4} \cdot \frac{T^2}{P}\right)$$

Figure 2G:
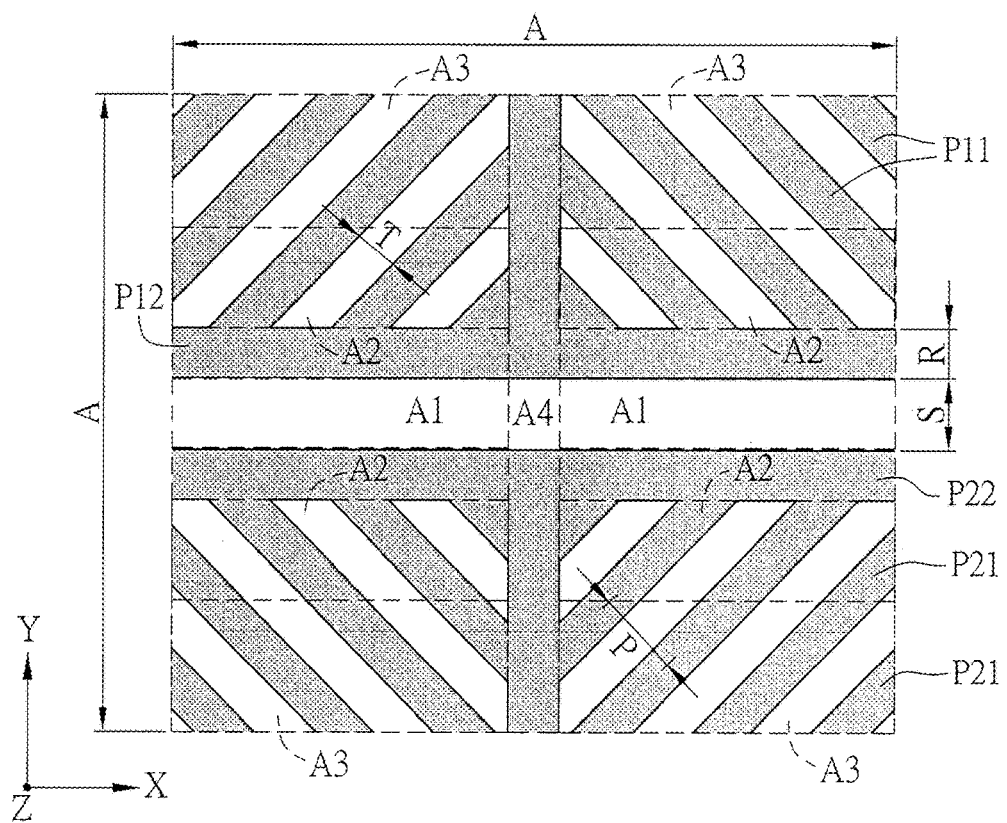
FIG. 2G is another schematic diagram of the region M in FIG. 1B.
Figure 2H:
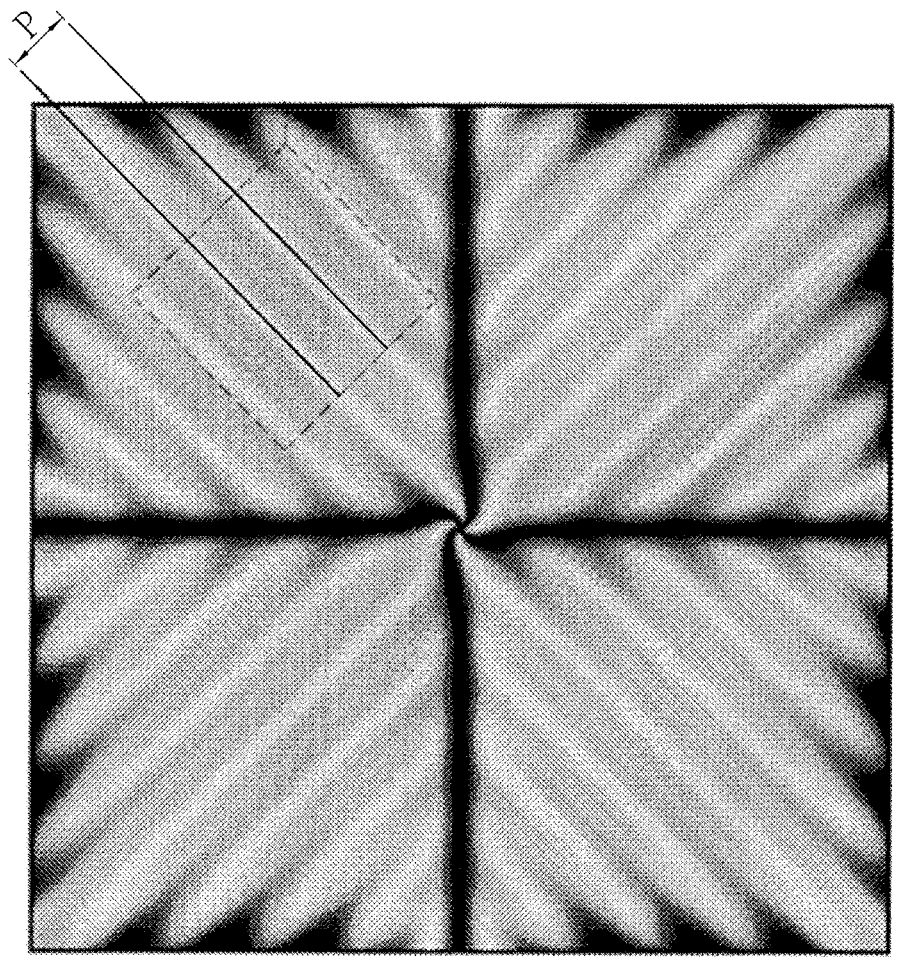
FIG. 2H is a schematic diagram for more clearly showing the distance P.
Figure 2H:
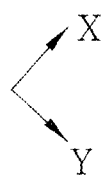

The electrode pattern of FIG. 2G is the same as that of FIG. 2A, but the difference between them is that the second distance P is defined as the interval between the centers of two adjacent first branch electrodes P11 or two adjacent second branch electrodes P21 instead of the interval between the centers of two adjacent bright textures. Moreover, the calculation of total equivalent permeable area (effective permeable area) can be known by referring to the corresponding calculation in FIGS. 2C to 2F, and besides, when the values of S, T, P satisfy the above equations 1 and 2, the display panel can be configured with a better and much better transmittances. Thus, the calculation thereof is omitted for conciseness.

Figure 3:
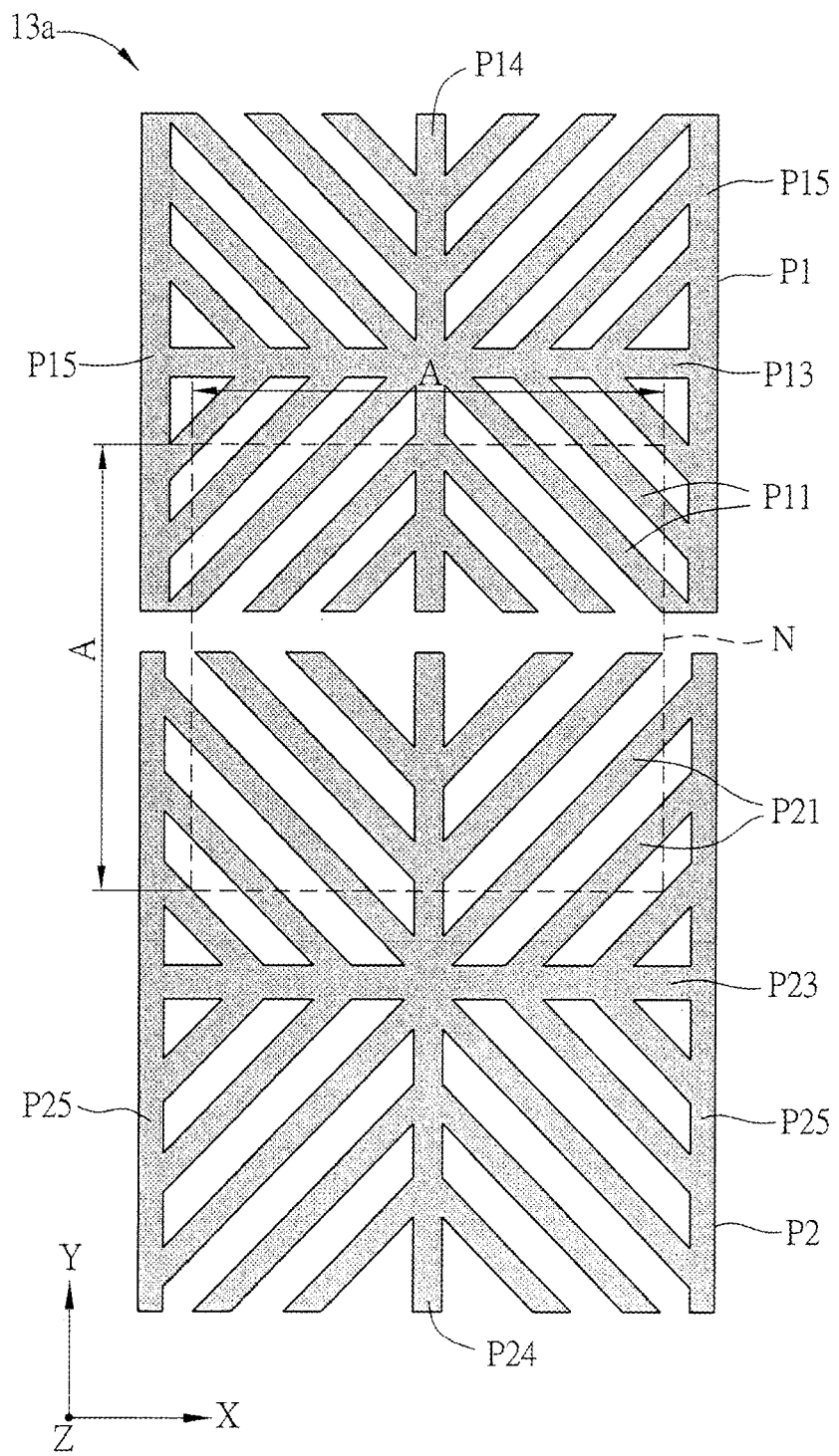
FIG. 3 is a schematic diagram of the electrode pattern of the electrode layer according to another embodiment of the invention.

FIG. 3 is a schematic diagram of the electrode pattern of the electrode layer 13a according to another embodiment of the invention.

As shown in FIG. 3, the electrode layer 13a also includes a first part P1 and a second part P2 disposed adjacent to the first part P1. However, the main difference between the electrode layers 13a and 13 is that the first part P1 of the electrode layer 13a doesn't include the first connecting electrode of the electrode layer 13 and the second part P2 of the electrode layer 13a also doesn't include the second connecting electrode of the electrode layer 13. Moreover, the first surrounding electrode P15 of the first part P1 is only disposed on two sides of the first part P1 and the second surrounding electrode P25 of the second part P2 is also only disposed on two sides of the second part P2.

Figure 4A:
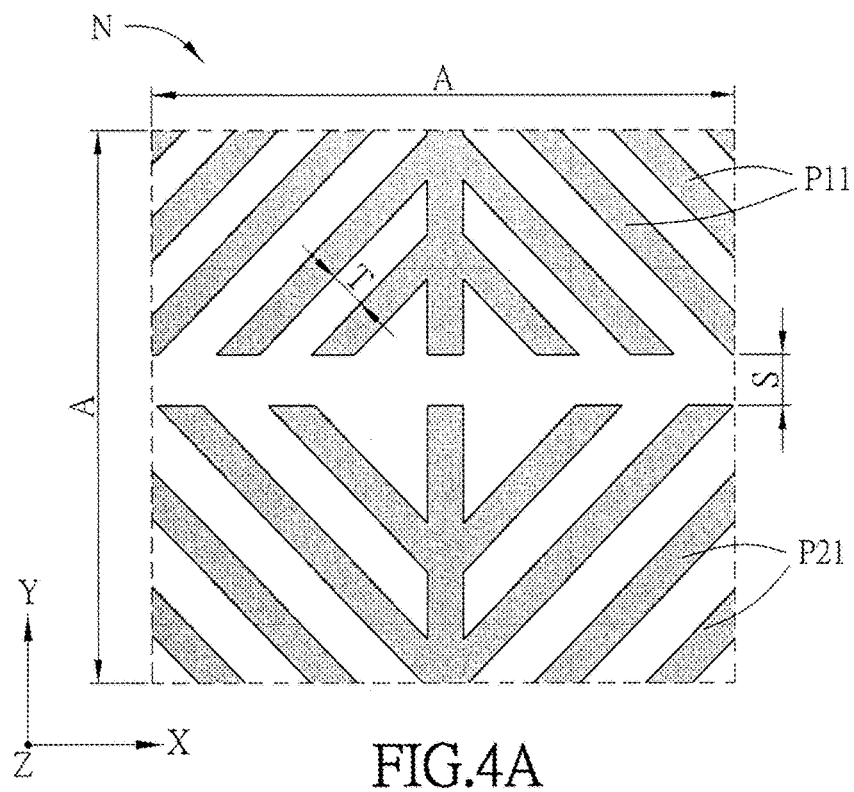
FIG. 4A is a schematic diagram of the region N in FIG. 3.
Figure 4B:
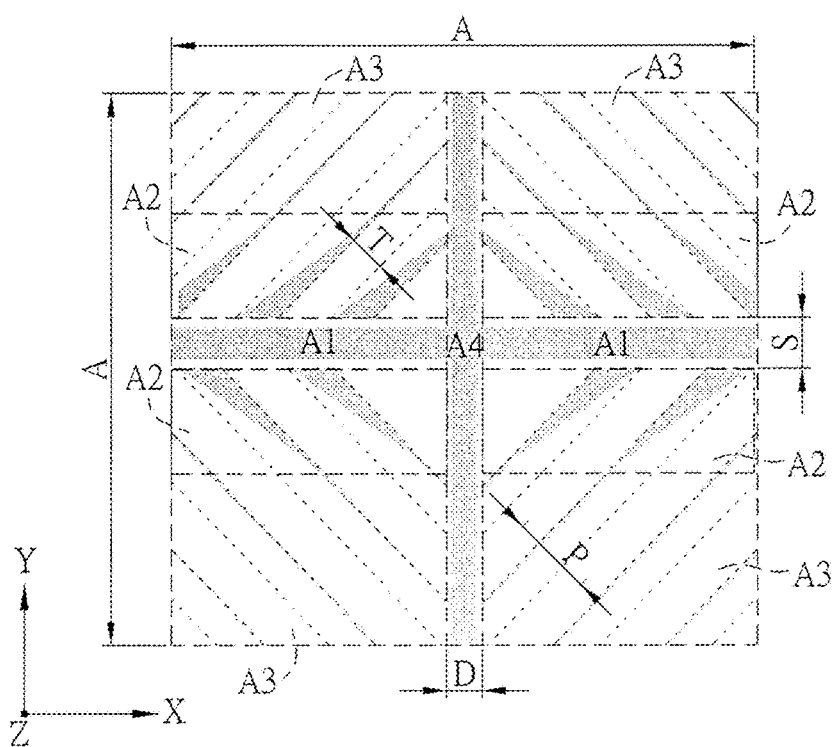
FIG. 4B is a schematic diagram of the brightness distribution generated when the light passes through the region N.

FIG. 4A is a schematic diagram of the region N in FIG. 3, and FIG. 4B is a schematic diagram of the brightness distribution of the region N when the light passes through the region N. To be noted, FIG. 4B is just for the illustrative purpose but not for representing the actual brightness distribution.

As shown in FIG. 4A, the first branch electrodes P11 are disposed along a direction and spaced from each other by a first distance T. The first part P1 and the second part P2 have a spacing S therebetween. As shown in FIG. 4B, due to the electrode pattern of the region N, a brightness distribution composed of a plurality of bright textures and a plurality of dark textures will be generated when the light passes through the region N. When the corresponding bright textures and dark textures are generated by the light passing through the first or second branch electrodes P11 or P21, the centers of the two adjacent bright textures bright textures (or dark textures), as shown in FIG. 2H, have an interval of a second distance P.

As below, the dark textures in the region A1, A2, A3, A4 in FIG. 4B will be illustrated for obtaining a better design range of the spacing S so as to obtain a better transmittance. FIGS. 4C to 4F are schematic diagrams of the dark textures in different regions of the brightness distribution of FIG. 4B.

Figure 4C:
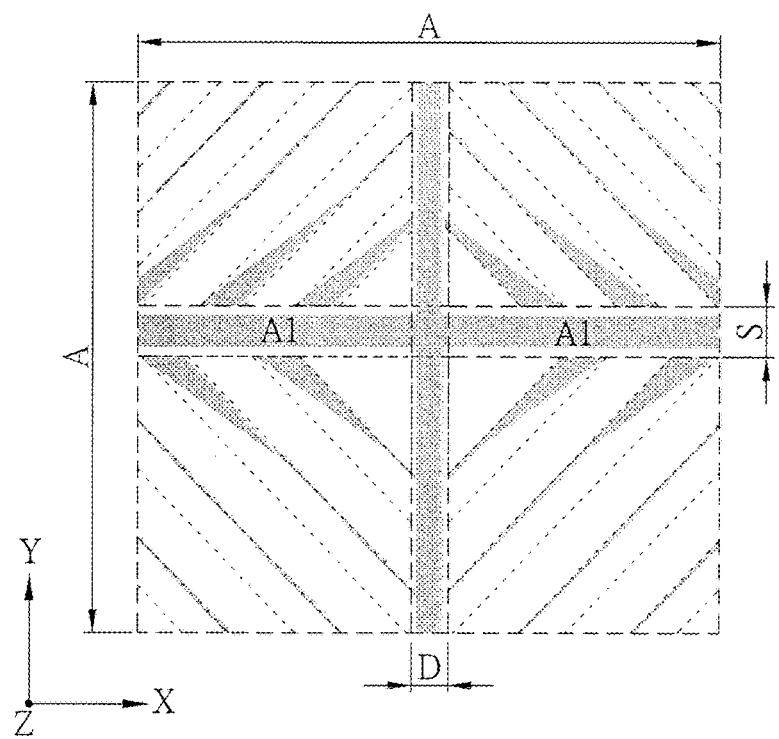
FIGS. 4C to 4F are schematic diagrams of the dark textures in different regions of the brightness distribution of FIG. 4B.

As shown in FIG. 4C, it can be obtained from the simulation that the proportion of the dark texture in the region A1 is a*S-b, wherein a=1/12, b=1/4. Thus, the area of the dark texture in the region A1 is equal to the area of the region A1 multiplied by the proportion of the dark texture in the region A1, as follows: (A−D)×S×(a×S−b).

Figure 4D:
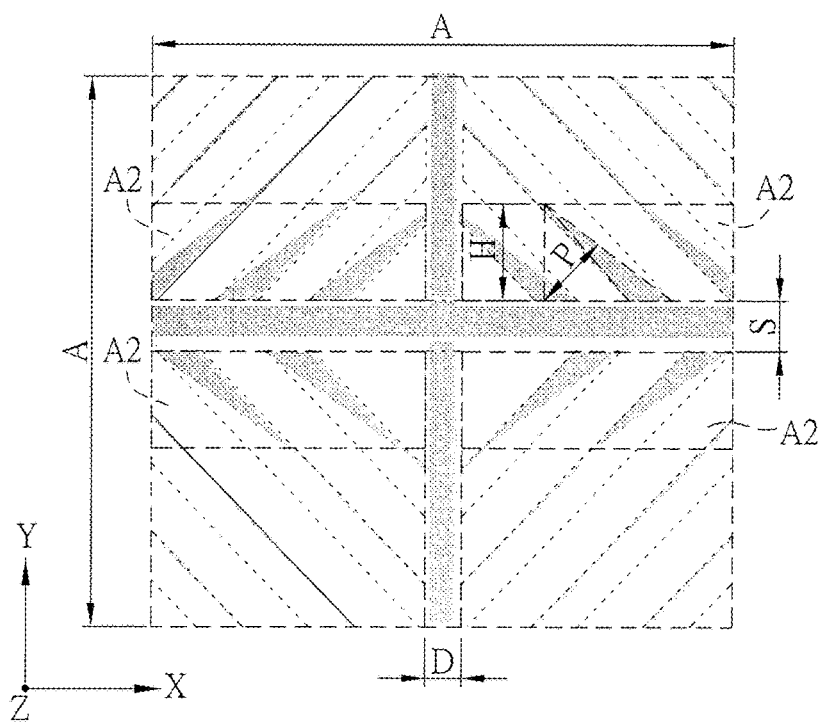

As shown in FIG. 4D, it can be obtained from the simulation that the proportion of the dark texture of the region A2 is −m*S+n, wherein m=1/15, n=1 in this embodiment. Like FIG. 2D, the base of the triangular dark texture is about equal to the interval between the adjacent dark textures. If the sum of the bases of the all triangular dark textures in a single region A2 on the upper right side of FIG. 4D is denoted by E, E is about equal to (A−D)/2*½. The height of the hypotenuse of the triangular dark texture is about P, and the height H thereof is equal to √2P. Accordingly, the area of the dark texture in the region A2 is equal to the area of the region A2 multiplied by the proportion of the dark texture in the region A2, as follows:

$$4 \times \frac{1}{2} \times \left(\frac{A-D}{4}\right) \times (\sqrt{2}\,P) \times (-m \times S + n)$$

Figure 4E:
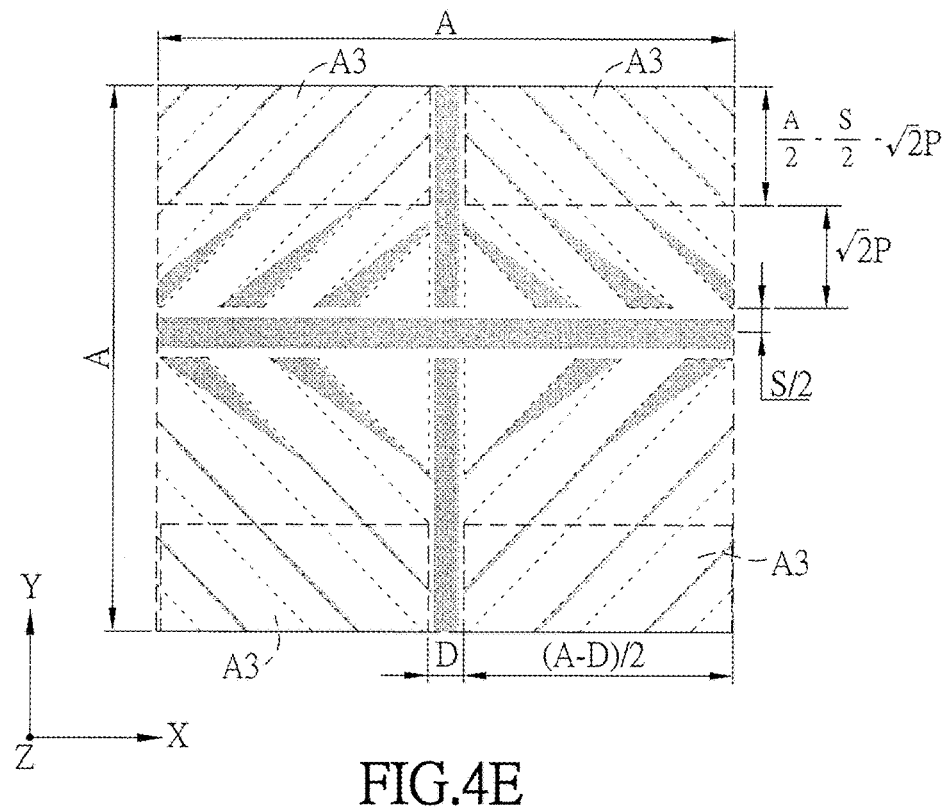

As shown in FIG. 4E, it can be obtained from the simulation the proportion of the dark texture of the region A3 is:

$$(1/4) \times \left(\frac{T^2}{P}\right)$$

Hence, the area of the dark texture in the region A3 is equal to the area of the region A3 multiplied by the proportion of the dark texture in the region A3, as follows:

$$4 \times \left(\frac{A-D}{2}\right) \times \left(\frac{A}{2} - \frac{S}{2} - \sqrt{2}\,P\right) \times \frac{1}{4} \times \frac{T^2}{P}$$

Figure 4F:
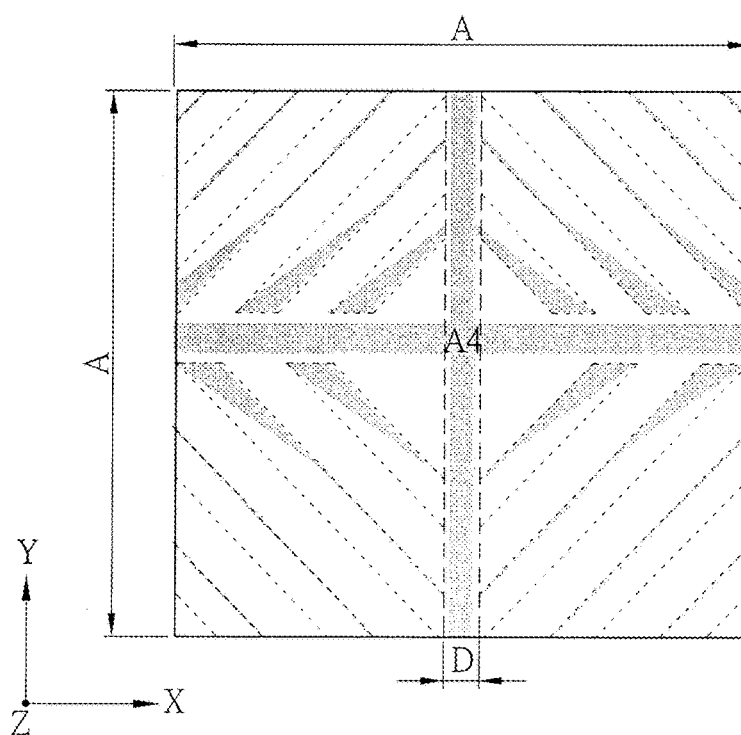

As shown in FIG. 4F, the area of the dark texture of the region A4 is equal to the width A multiplied by the width D (along the first direction X) of the dark texture formed by the second main electrode P14 and the fourth main electrode P24.

Since the transmittance is directly proportional to the total equivalent permeable area, the total equivalent permeable area (called effective permeable area hereinafter) is equal to the total area minus the dark-texture area of the region A1, the dark-texture area of the region A2, the dark-texture area of the region A3 and the dark-texture area of the region A4, as follows:

$$A^2 - (A-D) \times S \times (a \times S - b) - 4 \times \frac{1}{2} \times \left(\frac{A-D}{4}\right) \times (\sqrt{2}\,P) \times (-m \times S + n) -$$
$$4 \times \left(\frac{A-D}{2}\right) \times \left(\frac{A}{2} - \frac{S}{2} - \sqrt{2}\,P\right) \times \frac{1}{4} \times \frac{T^2}{P} - A \times D$$

Thus, the effective permeable area can be obtained as follows:

$$(A-D) \times \left\{ A - [(A - 2\sqrt{2}\,P) - S] \times \frac{1}{4} \times \frac{T^2}{P} - \right.$$
$$\left. (a \cdot S^2 - b \cdot S) - \left(\frac{-\sqrt{2}\,P \cdot m}{2} S + \frac{\sqrt{2}}{2} P \cdot n\right) \right\}$$

By differentiating the above equation and making it equal to zero to derive the maximum thereof, the equation can be obtained as follows:

$$\frac{1}{4} \times \frac{T^2}{P} - 2a \cdot S + b + \frac{P \cdot m}{\sqrt{2}} = 0$$

Accordingly, the equation can be obtained as follows:

$$S = \frac{1}{2a} \times \left(b + \frac{P \cdot m}{\sqrt{2}} + \frac{1}{4} \times \frac{T^2}{P}\right)$$

Wherein, a=1/12, b=1/4, m=1/15.

Moreover, in consideration of the process variation, the optimum range of the spacing S of this embodiment can be (equation 3):

$$\frac{1}{2a} \cdot \left(b + \frac{P \cdot m}{\sqrt{2}} + \frac{1}{4} \cdot \frac{T^2}{P}\right) - 1.5 \leq S \leq \frac{1}{2a} \cdot \left(b + \frac{P \cdot m}{\sqrt{2}} + \frac{1}{4} \cdot \frac{T^2}{P}\right) + 1.5$$

Wherein a=1/12, b=1/4, m=1/15, and the units of S, T, P are μm. Hence, when the values of S, T, P satisfy the above equation, the best effective permeable area can be provided and the display panel 1 can be thus configured with a better transmittance. However, more favorably, the display panel 1 can be configured with a much better transmittance if the values of S, T, P satisfy the following equation (equation 4):

$$\frac{1}{2a} \cdot \left(b + \frac{P \cdot m}{\sqrt{2}} + \frac{1}{4} \cdot \frac{T^2}{P}\right) - 1 \leq S \leq \frac{1}{2a} \cdot \left(b + \frac{P \cdot m}{\sqrt{2}} + \frac{1}{4} \cdot \frac{T^2}{P}\right) + 1$$

By substituting a=1/12 and b=1/4 into the equation 3 and 4, the equations can be obtained, respectively, as follows:

$$6 \times \left(\frac{P \cdot m}{\sqrt{2}} + \frac{1}{4} \cdot \frac{T^2}{P}\right) \leq$$

$$S \leq \left[3 + 6 \times \left(\frac{P \cdot m}{\sqrt{2}} + \frac{1}{4} \cdot \frac{T^2}{P}\right)\right] \frac{1}{2} + 6 \times \left(\frac{P \cdot m}{\sqrt{2}} + \frac{1}{4} \cdot \frac{T^2}{P}\right) \leq$$

$$S \leq \frac{5}{2} + 6 \times \left(\frac{P \cdot m}{\sqrt{2}} + \frac{1}{4} \cdot \frac{T^2}{P}\right)$$

Figure 4G:
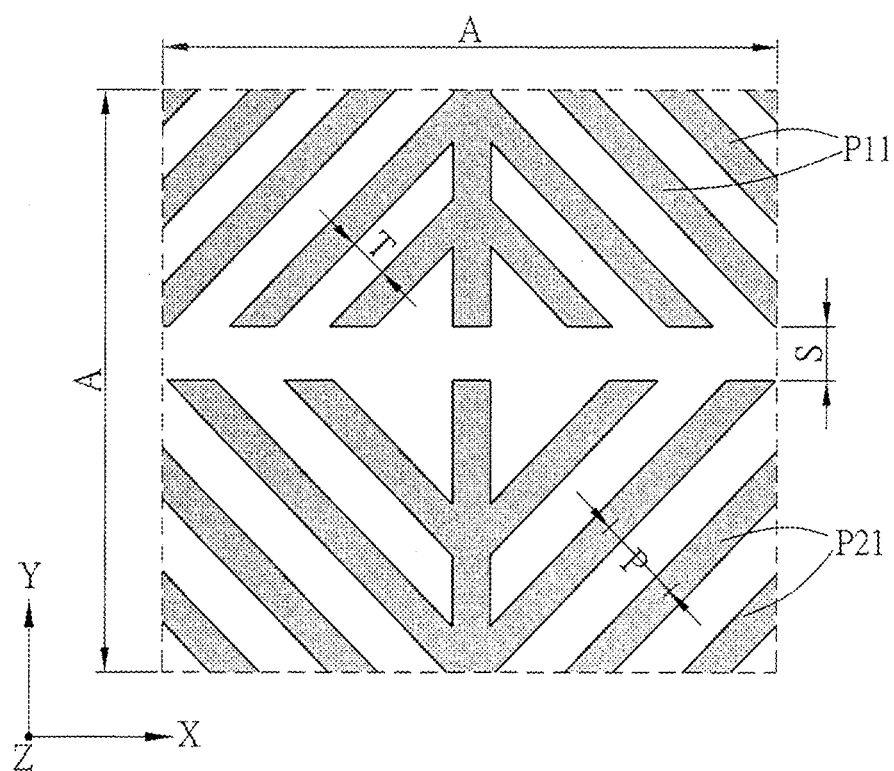
FIG. 4G is another schematic diagram of the region N in FIG. 3.

The electrode pattern of FIG. 4G is the same as that of FIG. 4A, but the difference between them is that the second distance P is defined as the interval between the centers of two adjacent first branch electrodes P11 or two adjacent second branch electrodes P21 instead of the interval between the centers of two adjacent bright textures. Moreover, the calculation of total equivalent permeable area (effective permeable area) can be known by referring to the corresponding calculation in FIGS. 4C to 4F, and besides, when the values of S, T, P satisfy the above equations 3 and 4, the display panel can be configured with a better and much better transmittances. Thus, the calculation thereof is omitted for conciseness.

Summarily, in the display panel of the invention, the first branch electrodes of the electrode layer are disposed along a direction and spaced from each other by a first distance (T), the centers of two adjacent ones of the bright textures are separated by a second distance (P), and the first connecting electrode and the second connecting electrode are corresponding to each other and separated by a spacing (S). Or, the first branch electrodes are disposed along a direction and spaced from each other by a first distance (T), the centers of two adjacent ones of the first branch electrodes are separated by a second distance (P), and the first connecting electrode and the second connecting electrode are corresponding to each other and separated by a spacing (S). When the values of S, T, P satisfy the following equation, a better total equivalent permeable area can be provided and the display panel can be thus configured with a better transmittance:

$$\frac{1}{2a} \cdot \left(b + \frac{P \cdot m}{\sqrt{2}} + \frac{1}{4} \cdot \frac{T^2}{P}\right) - 1.5 \leq S \leq \frac{1}{2a} \cdot \left(b + \frac{P \cdot m}{\sqrt{2}} + \frac{1}{4} \cdot \frac{T^2}{P}\right) + 1.5$$

Wherein, a=1/12, b=1/4, m=1/10, or a=1/12, b=1/4, m=1/15.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A display panel, comprising:
   a first substrate and a second substrate disposed opposite to the first substrate; and
   an electrode layer disposed on the first substrate and facing the second substrate, and including at least a first part and a second part adjacent to the first part, wherein the first part includes a plurality of first branch electrodes, the first branch electrodes are disposed along a direction and spaced from each other by a first distance (T), the centers of two adjacent ones of the first branch electrodes are separated by a second distance (P), the first part and the second part have a spacing (S) therebetween, and values of S, T and P satisfy the following equation:

$$\frac{1}{2a} \cdot \left(b + \frac{P \cdot m}{\sqrt{2}} + \frac{1}{4} \cdot \frac{T^2}{P}\right) - 1.5 \leq S \leq \frac{1}{2a} \cdot \left(b + \frac{P \cdot m}{\sqrt{2}} + \frac{1}{4} \cdot \frac{T^2}{P}\right) + 1.5$$

wherein, a=1/12, b=1/4, m=1/10, and units of S, T and P are micrometer.

2. The display panel as recited in claim 1, wherein the values of S, T, P further satisfy the following equation:

$$\frac{1}{2a} \cdot \left(b + \frac{P \cdot m}{\sqrt{2}} + \frac{1}{4} \cdot \frac{T^2}{P}\right) - 1 \leq S \leq \frac{1}{2a} \cdot \left(b + \frac{P \cdot m}{\sqrt{2}} + \frac{1}{4} \cdot \frac{T^2}{P}\right) + 1.$$

3. The display panel as recited in claim 1, wherein the first part further includes a first main electrode and a second main electrode, the first main electrode intersects with the second main electrode, the first branch electrodes are connected with the first main electrode or the second main electrode.

4. The display panel as recited in claim 1, wherein the second part further includes a third main electrode, a fourth main electrode and a plurality of second branch electrodes, the third main electrode intersects with the fourth main electrode, and the second branch electrodes are connected with the third main electrode or the fourth main electrode.

5. A display device, comprising:
   a first substrate and a second substrate disposed opposite to the first substrate; and
   an electrode layer disposed on the first substrate and facing the second substrate, and including at least a first part and a second part adjacent to the first part, wherein the first part includes a plurality of first branch electrodes, the first branch electrodes are disposed along a direction and spaced from each other by a first distance (T), the centers of two adjacent ones of the first branch electrodes are separated by a second distance (P), the first part and the second part have a spacing (S) therebetween, and values of S, T and P satisfy the following equation:

$$\frac{1}{2a} \cdot \left( b + \frac{P \cdot m}{\sqrt{2}} + \frac{1}{4} \cdot \frac{T^2}{P} \right) - 1.5 \leq S \leq \frac{1}{2a} \cdot \left( b + \frac{P \cdot m}{\sqrt{2}} + \frac{1}{4} \cdot \frac{T^2}{P} \right) + 1.5$$

wherein, $a=1/12$, $b=1/4$, $m=1/10$, and units of S, T and P are micrometer.

6. The display device as recited in claim 5, wherein the values of S, T, P further satisfy the following equation:

$$\frac{1}{2a} \cdot \left( b + \frac{P \cdot m}{\sqrt{2}} + \frac{1}{4} \cdot \frac{T^2}{P} \right) - 1 \leq S \leq \frac{1}{2a} \cdot \left( b + \frac{P \cdot m}{\sqrt{2}} + \frac{1}{4} \cdot \frac{T^2}{P} \right) + 1.$$

7. The display device as recited in claim 5, wherein the first part further includes a first main electrode and a second main electrode, the first main electrode intersects with the second main electrode, the first branch electrodes are connected with the first main electrode or the second main electrode.

8. The display device as recited in claim 5, wherein the second part further includes a third main electrode, a fourth main electrode and a plurality of second branch electrodes, the third main electrode intersects with the fourth main electrode, and the second branch electrodes are connected with the third main electrode or the fourth main electrode.

* * * * *